(12) United States Patent
Graham (10) Patent No.: US 6,433,452 B1
(45) Date of Patent: Aug. 13, 2002

(54) MAGNETIC MOTOR

(76) Inventor: W. Ralph Graham, 5235 Greenpoint Dr., Stone Mountain, GA (US) 30088

( * ) Notice: Subject to any disclaimer, the term of this patent is extended or adjusted under 35 U.S.C. 154(b) by 0 days.

(21) Appl. No.: 09/849,009

(22) Filed: May 7, 2001

(51) Int. Cl.⁷ .............................................. H02K 21/00
(52) U.S. Cl. ....................................... 310/152; 310/103
(58) Field of Search ............................ 310/152, 83, 80, 310/84, 75 A, 103; H02K 21/00, 23/04, 7/10

(56) References Cited

U.S. PATENT DOCUMENTS

| | | |
|---|---|---|
| 2,471,947 A | 5/1949 | Giannini |
| 2,682,004 A * | 6/1954 | Schulenburg ................ 310/80 |
| 3,790,833 A | 2/1974 | Hasebe |
| 3,831,537 A | 8/1974 | Siegel |
| 3,895,245 A | 7/1975 | Bode |
| 3,899,703 A | 8/1975 | Kinnison |
| 3,935,487 A | 1/1976 | Czerniak |
| 3,967,146 A | 6/1976 | Howard |
| 4,179,633 A | 12/1979 | Kelly |
| 4,600,849 A | 7/1986 | Lawson et al. |
| 5,304,881 A * | 4/1994 | Flynn et al. ........... 310/156.46 |
| 5,739,627 A | 4/1998 | Lamb |
| 5,753,990 A | 5/1998 | Flynn et al. |
| 6,274,959 B1 * | 8/2001 | Uchiyama ................. 310/75 R |

* cited by examiner

Primary Examiner—Tran Nguyen
Assistant Examiner—Karen Addison
(74) Attorney, Agent, or Firm—Rodgers & Rodgers (57) ABSTRACT

By this invention, rotation of an output shaft is achieved by means of a magnetic motor comprising a vertically movable power rod and a rotatable balance wheel wherein multiple permanent magnets are affixed to the outer periphery of the balance wheel and a single permanent magnet is affixed to the power rod so that the magnets on the balance wheel come into intermittent proximity to the magnet on the power rod by which the magnetic forces between the magnets cause rotation to the output shaft.

12 Claims, 9 Drawing Sheets

MAGNETIC MOTOR

BACKGROUND OF THE INVENTION

By this invention, means is provided to convert magnetic energy to rotational energy so as to achieve the ecological benefit of reduced fuel consumption. Such rotation is achieved utilizing the repulsive or attractive forces by the interaction of magnetic forces between the respective magnets which change orientation spatially while maintaining rotation of an output shaft.

SUMMARY OF THE INVENTION

By this invention, a magnetic motor is provided wherein rotation of an output shaft is achieved by means of a cam wheel which is interconnected to the output shaft and an associated power rod operatively associated therewith with a magnet attached to the power rod. Multiple magnets are affixed to the outer periphery of a balance wheel which is interconnected to the output shaft. Linear movement of the magnet mounted on the power rod with intermittent attractive or repulsive forces between magnet mounted on the power rod and multiple magnets mounted on the balance wheel provides continuous rotation to the output shaft.

DETAILED DESCRIPTION OF THE INVENTION

Figure 1:
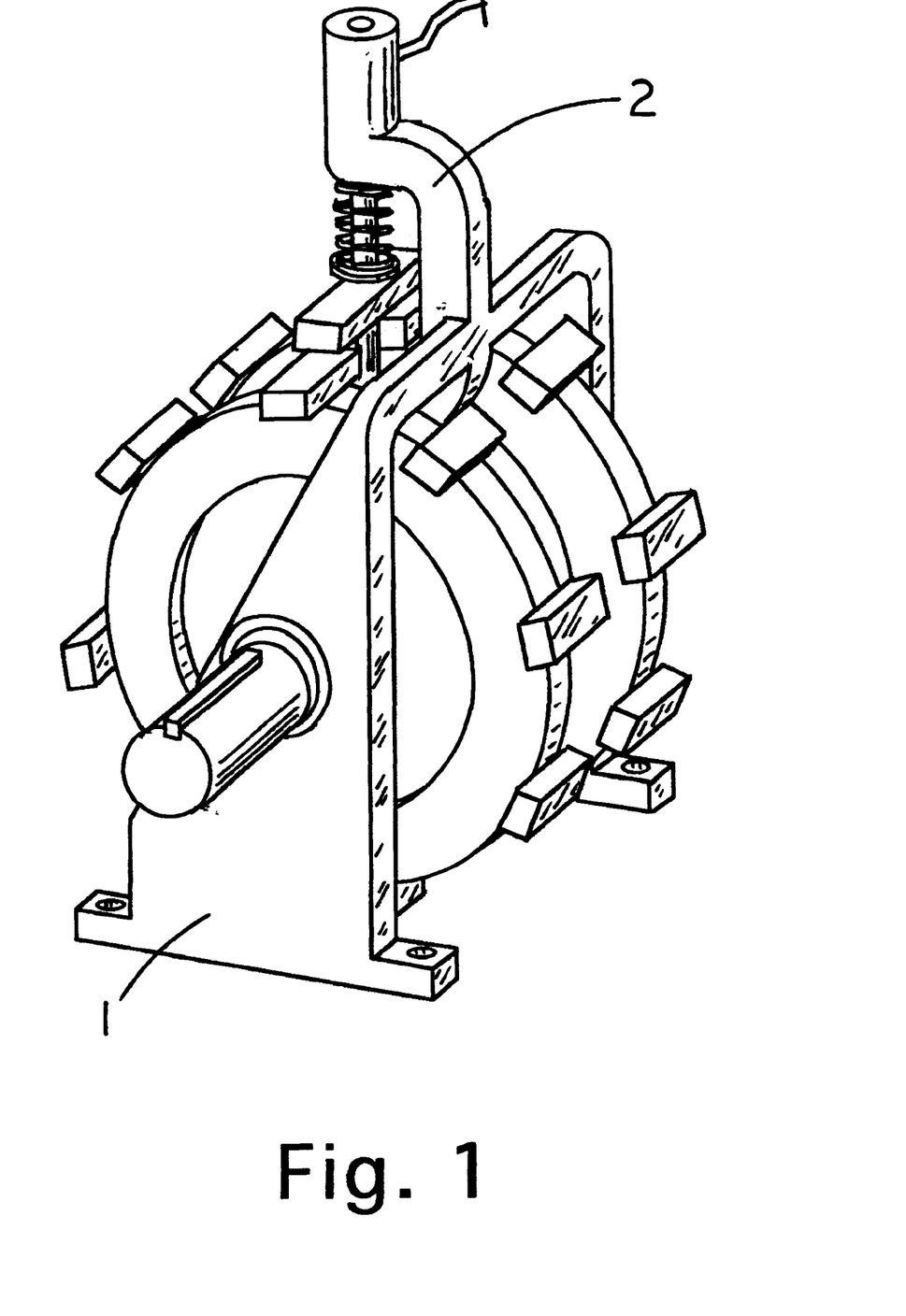
FIG. 1 is a perspective view of a magnetic motor according to this invention.

In the drawings with particular reference to FIG. 1, the numeral 1 designates the inverted U-shaped base frame for the magnetic motor with C-shaped support arm 2 integrally joined thereto and extending vertically therefrom. As best viewed in FIG. 2a, apertures 3 and 4 are formed in support arm 2 with conventional bushings 5 and 6 disposed therein, respectively. Power rod 7 is slidably disposed within apertures 3 and 4 and permanent magnet 8 is affixed thereto.

Figures 2A, 2B:
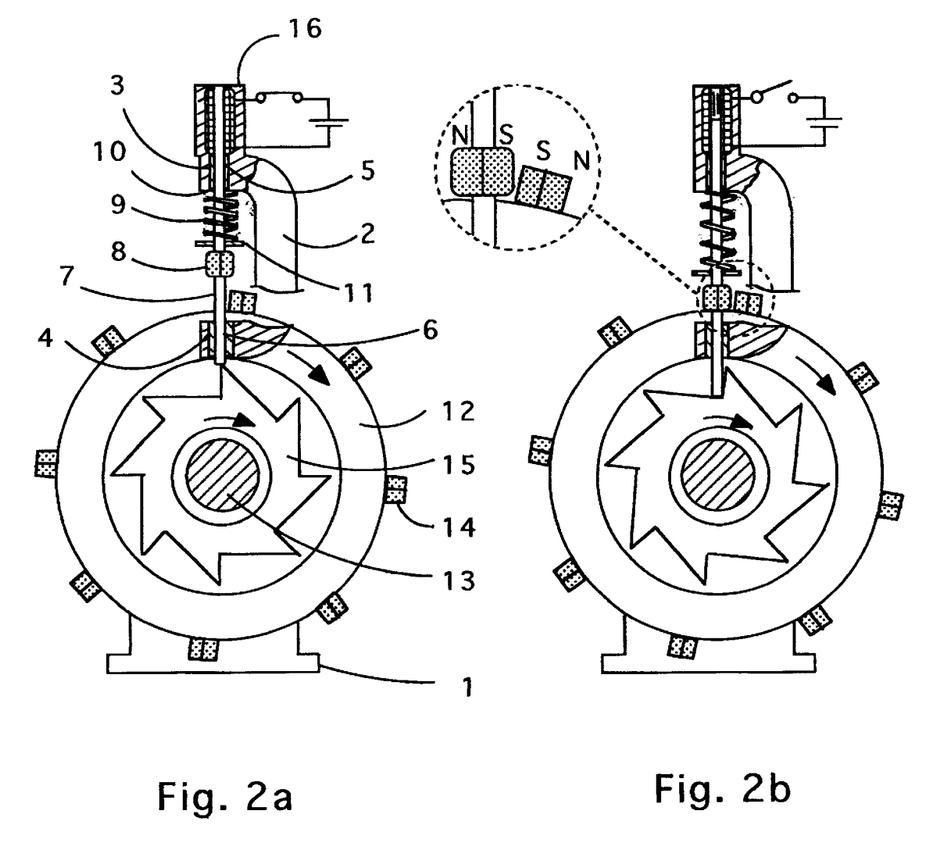
FIGS. 2a and 2b depict side elevational views showing rotation in a clockwise direction.

In order to provide vertical movement to power rod 7, compression spring 9 is coaxially disposed with respect to power rod 7. For the purpose of providing abutment surfaces for spring 9, flanges 10 and 11 are, respectively, positioned at the ends of spring 9 and are coaxially disposed with respect to power rod 7.

To complete the basic elements of the motor, balance wheel 12 is mounted on output shaft 13 with multiple permanent magnets 14 attached to the outer peripheral surface of balance wheel 12. Cam wheel 15 is coaxially mounted on output shaft 13 and solenoid 16 is provided at the upper end of power rod 7. Finally, output shaft 13 is journalled on base frame 1 as is well known.

Figure 3A:
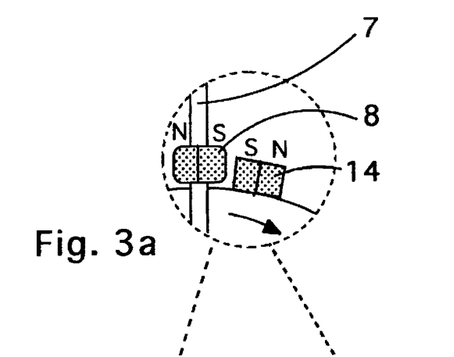
FIGS. 3a–3e show the interaction between the magnets to produce clockwise rotation.
Figure 3B:
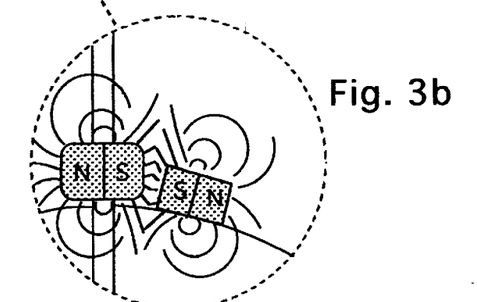
Figure 3C:
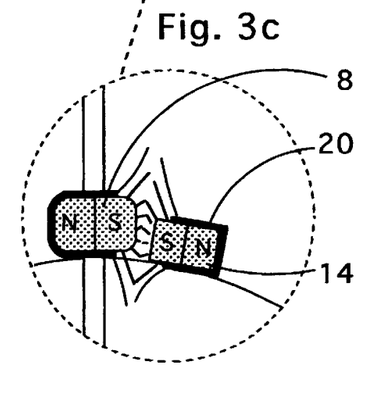
Figure 3D:
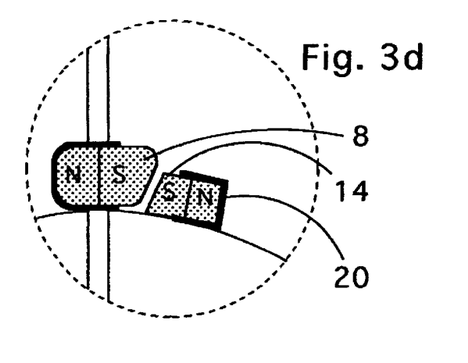
Figure 3E:
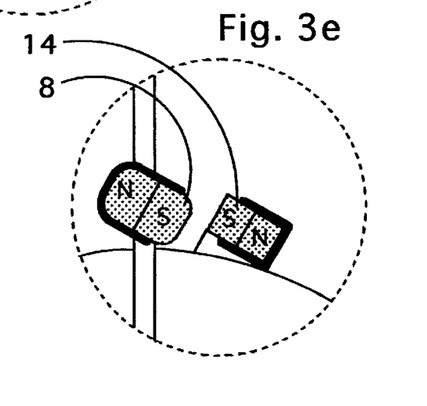

FIGS. 3a through 3e and FIGS. 4a and 4b show schematically the various magnetic forces between magnets 8 and 14. More specifically, FIG. 3a shows the repulsive action between magnets 8 and 14 and FIGS. 3b and 3c show the magnetic field lines thereof. FIG. 3c shows the magnetic field lines of magnets 8 and 14 which are partially encased in shields 20. Of course, shields 20 allow only exposure of the desired positive or negative magnet face thereby eliminating any stray magnetism which can significantly interfere with proper functioning of the magnetic motor. In FIG. 3d, the exposed faces of the magnets are angularly oriented in a complementary fashion so as to lengthen the time the repulsive forces interact between the magnets.

Figures 4A, 4B:
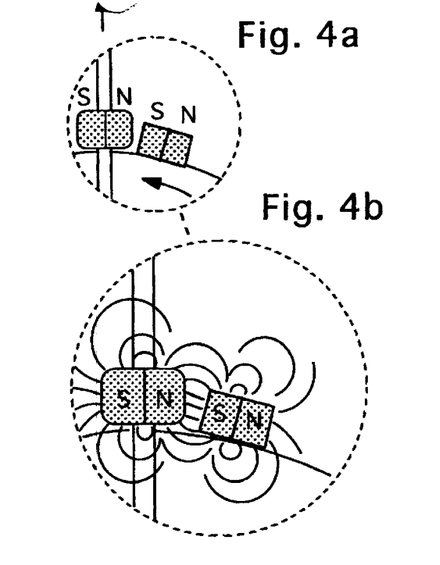
FIGS. 4a and 4b show the interaction between the magnets to provide counterclockwise rotation.

FIGS. 4a and 4b depict the rotation of output shaft 13 in a counterclockwise direction as opposed to the clockwise direction shown in FIGS. 3a through 3e. The magnetic field lines of the magnets depicted in FIG. 4a are shown in FIG. 4b.

Figure 5:
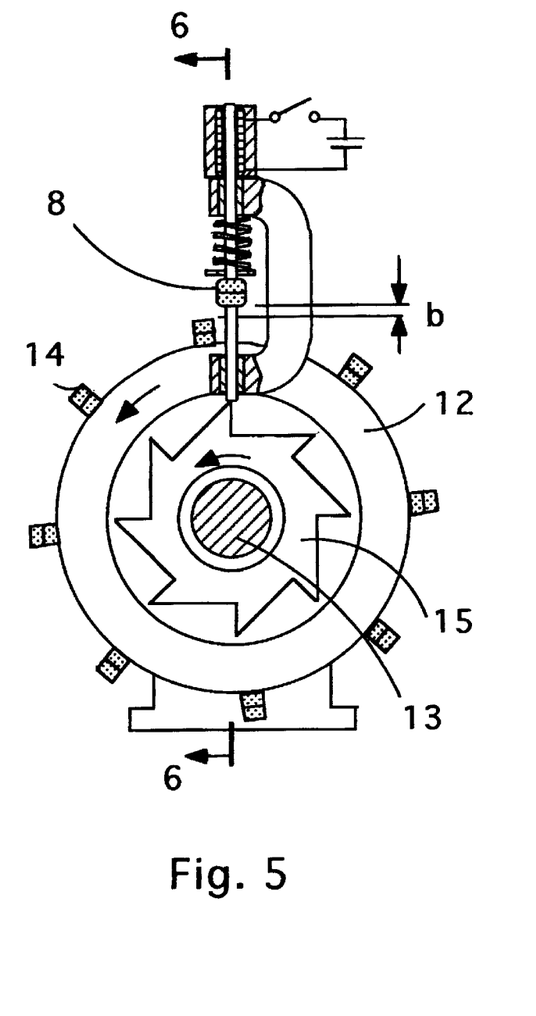
FIG. 5 is a side elevational view similar to FIG. 2.

FIG. 5 shows structure virtually identical to that shown in connection with FIG. 2 except that the polarities of magnets 8 and 14 are reversed so as to achieve attractive force between the magnets and thereby achieve a counterclockwise rotation of output shaft 13.

Figure 6:
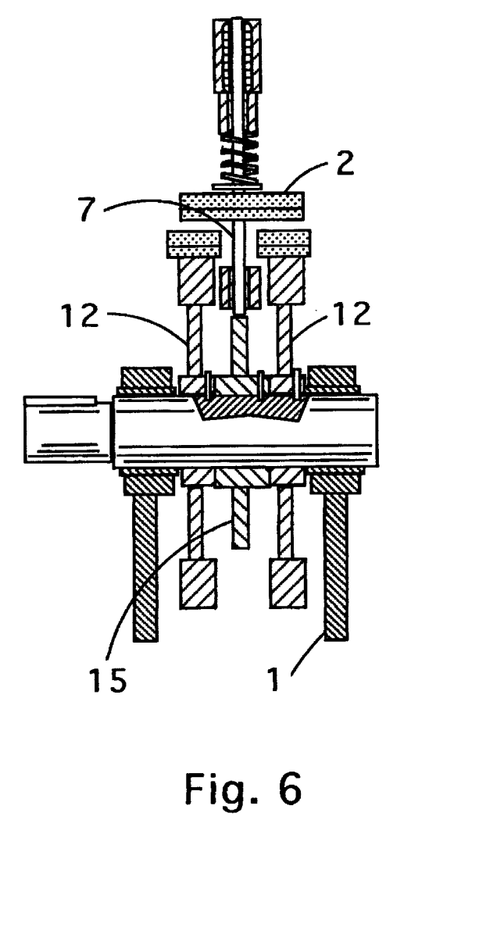
FIG. 6 is a view taken along the line 6—6 in FIG. 5.

In FIG. 6, a typical arrangement of a magnetic motor embodying a single power rod 7 is shown wherein cam wheel 15 is disposed between a pair of balance wheels 12.

Figures 7A, 7B, 7C:
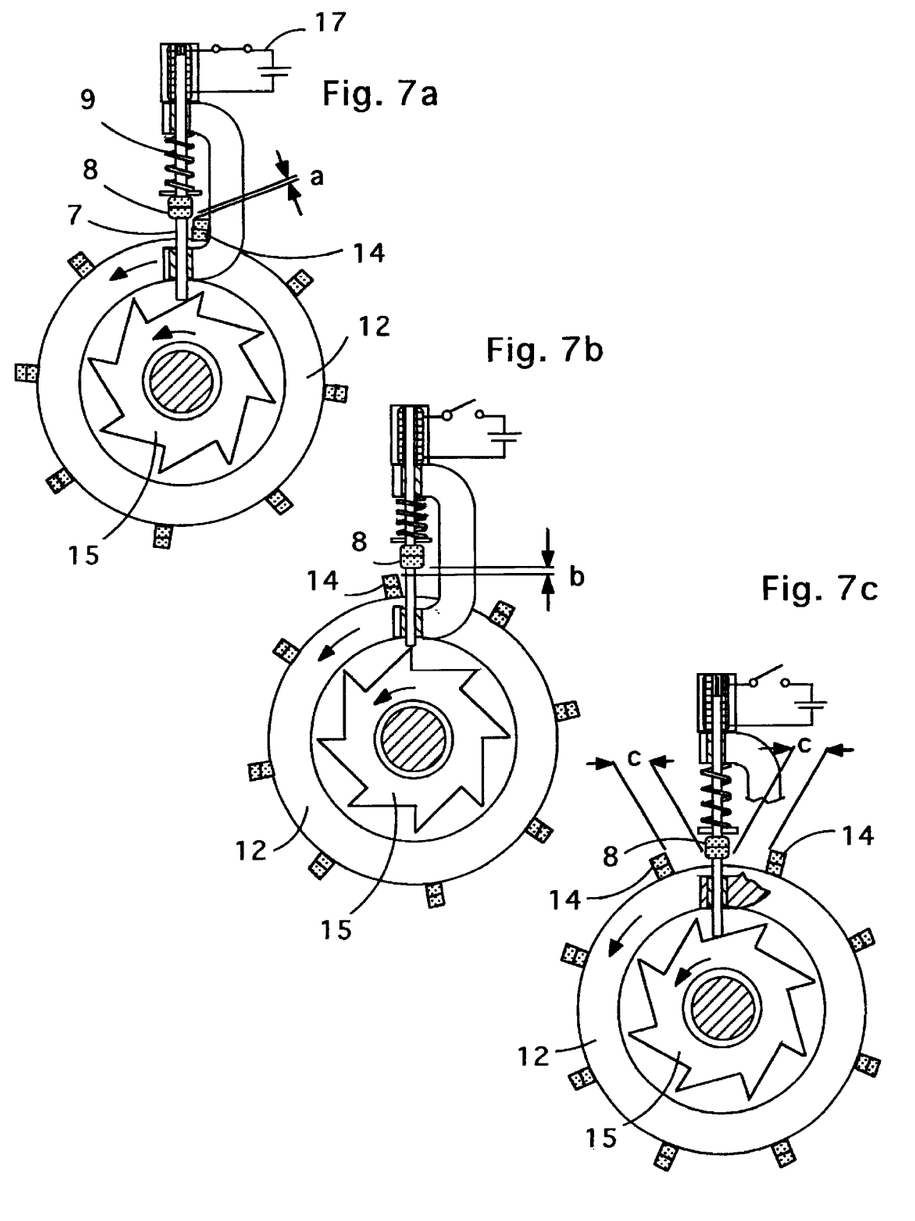
FIGS. 7a, 7b and 7c are side elevational views depicting the orientation of the magnets during the rotational process.

FIGS. 7a, 7b and 7c depict the firing sequence of solenoid 16 wherein, in FIG. 7a, relay 17 is closed with a minimum gap between magnet 8 mounted on power rod 7 and magnet 14 mounted on balance wheel 12. At this point, the maximum magnetic pull between magnets 8 and 14 is achieved and the gap between magnets 8 and 14 is indicated by the letter "a." As the lower tip of power rod 7 follows along the outer cam surface of cam wheel 15, spring 9 is compressed and relay 17 is open. Thus, the maximum compression of spring 9 and maximum clearance between magnets 8 and 14 is achieved as indicated by the letter "b" in FIG. 7b. FIG. 7c shows magnet 8 interposed equidistant between adjacent magnets 14 as indicated by the letter "c" whereby any magnetic push or pull effect is obviated.

Figure 8:
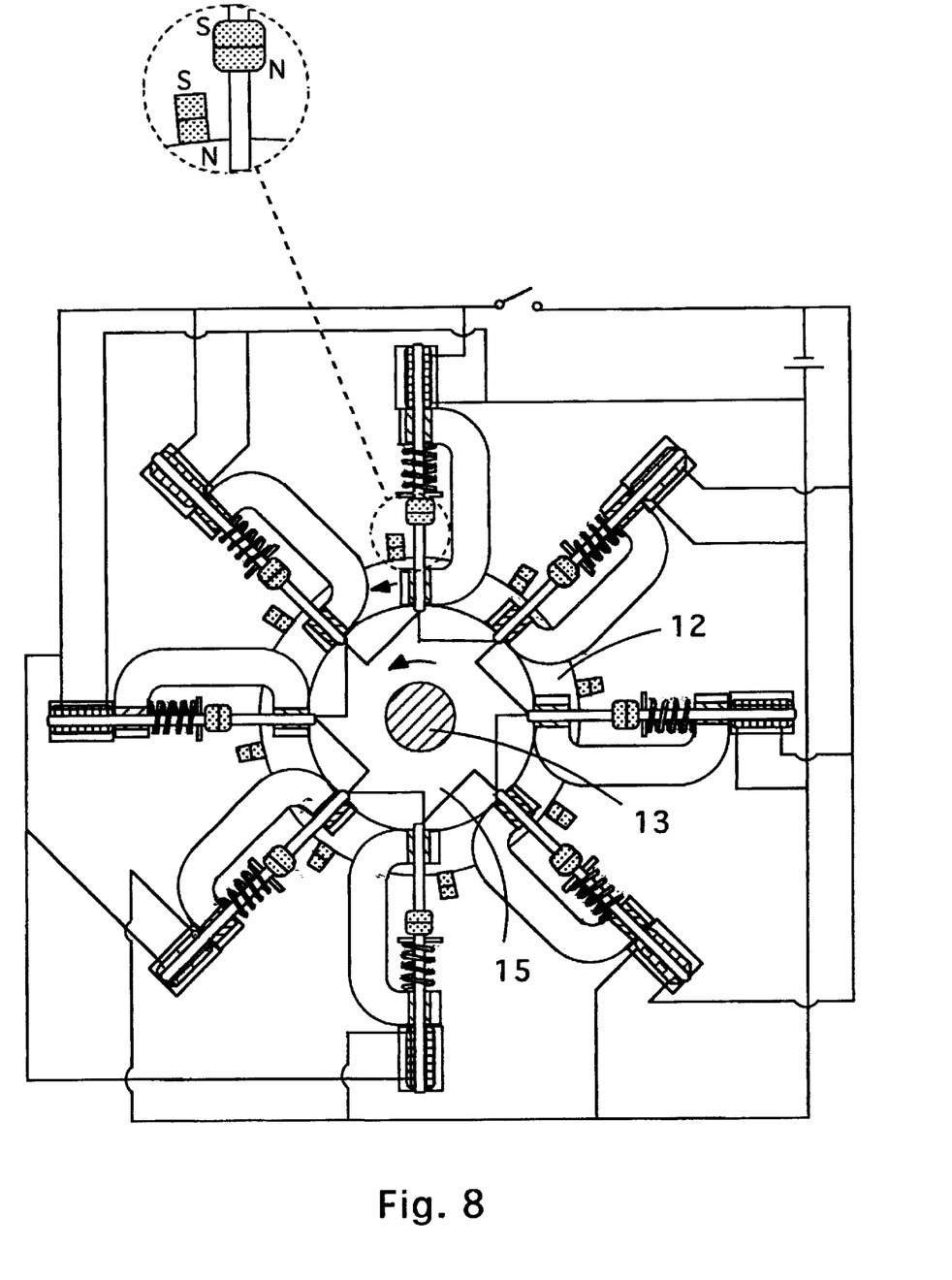
FIG. 8 is a top plan view depicting multiple magnetic motors.

In FIG. 8, an arrangement of eight motors is shown so as to achieve maximum rotational power of output shaft 13.

Figure 9:
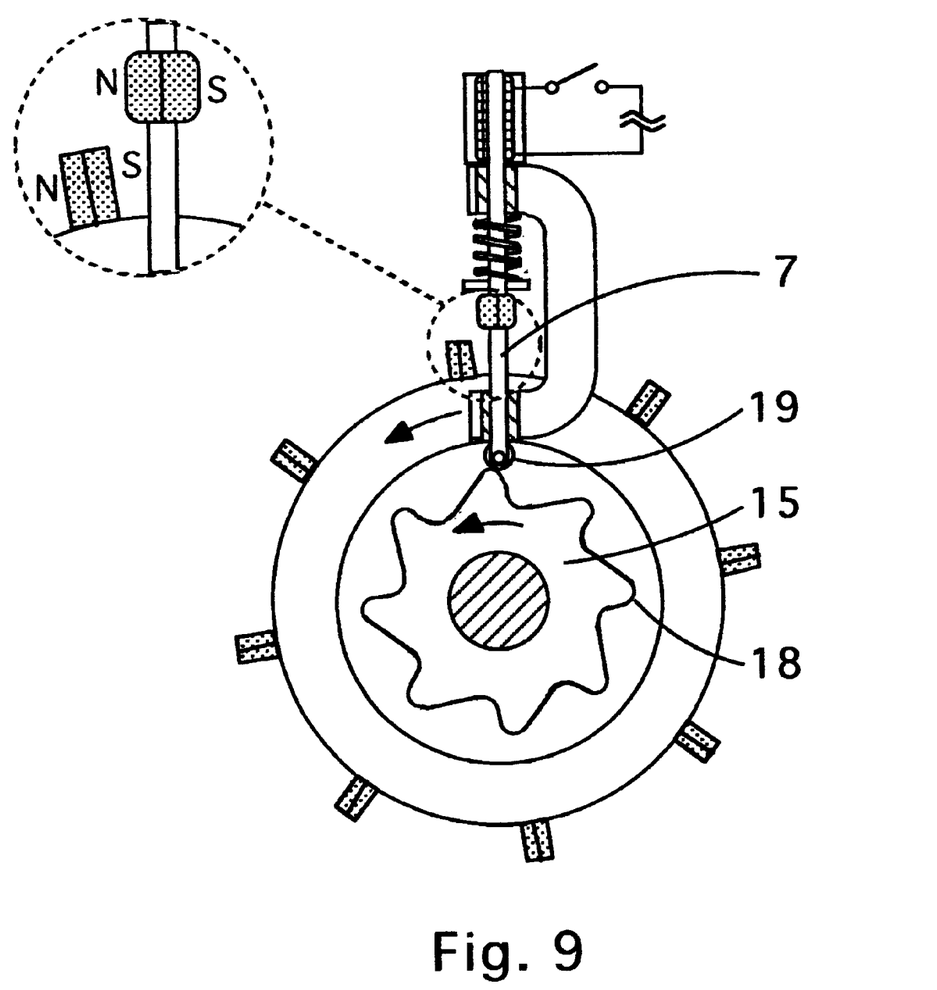
FIG. 9 is a side elevational view of an alternative form of the invention.

In FIG. 9, cam wheel 15 is provided with curved outer peripheral cam surface 18 in order to achieve higher rotational speeds and to accommodate roller 19 mounted on the lower tip of power rod 7.

Figure 10:
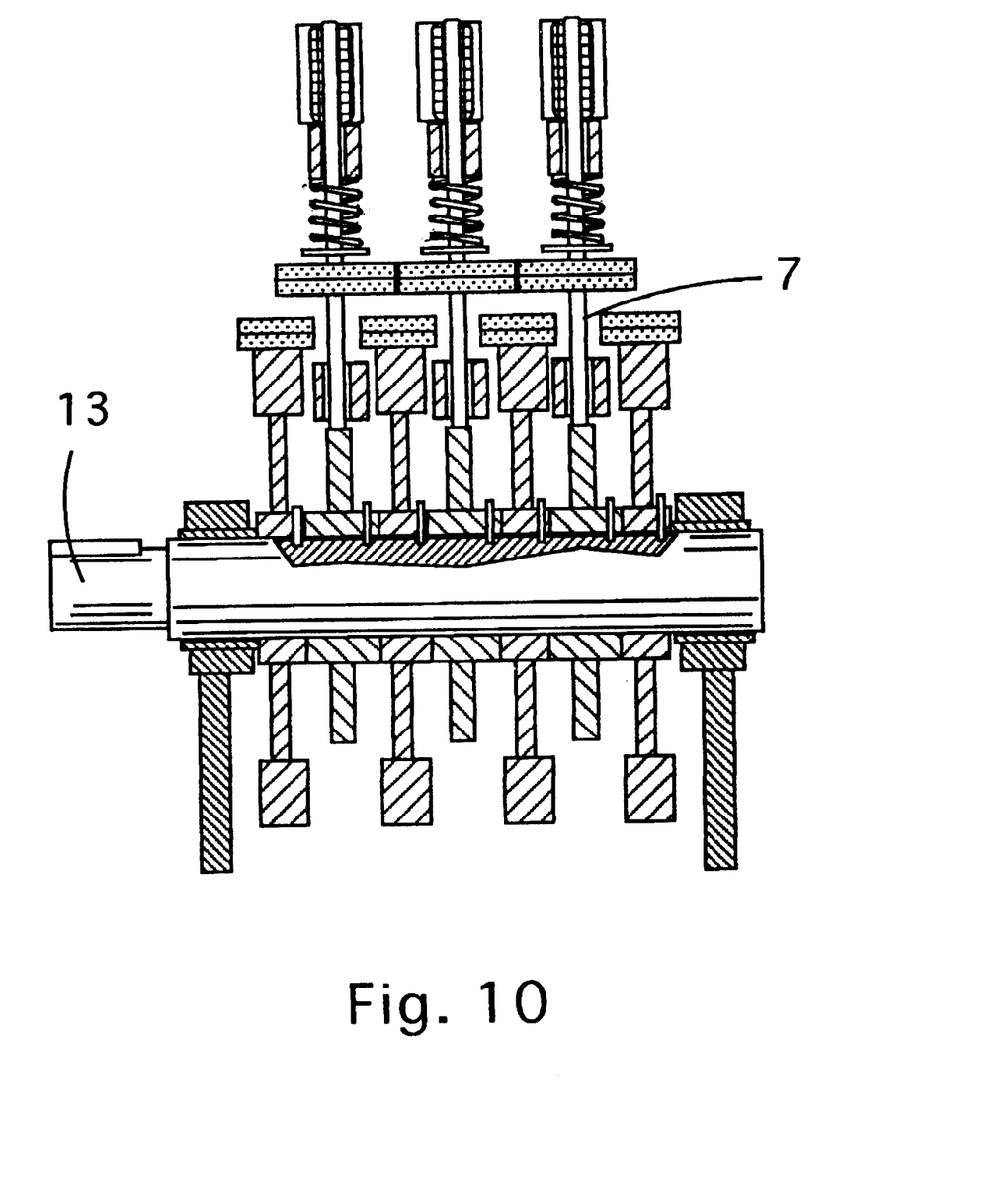
FIG. 10 is a further alternative form of the invention.

FIG. 10 shows an alternate arrangement wherein multiple power rods 7 and related structure are disposed laterally in order to increase rotational power to output shaft 13.

Figure 11A:
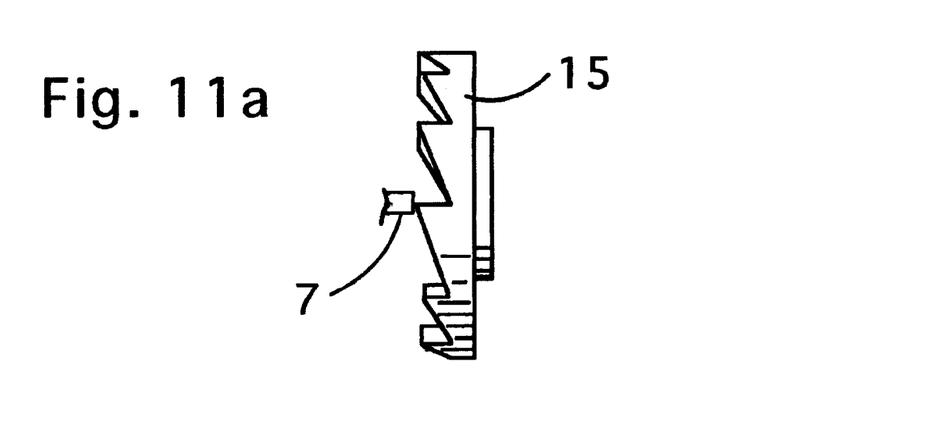
FIGS. 11a and 11b show another modification of the invention.
Figure 11B:
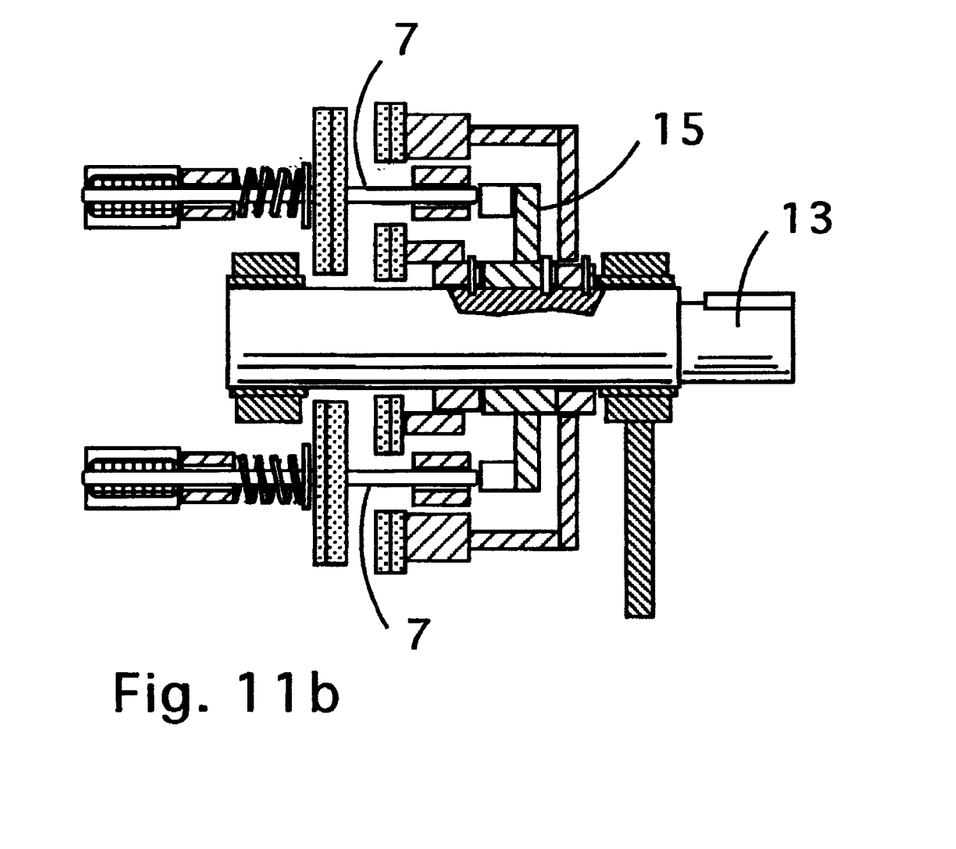

A further alternative embodiment is shown in FIG. 11a wherein the axis of power rod 7 and output shaft 13 are parallel and the cam follower surface is disposed on the side of cam wheel 15. In FIG. 11b a pair of power rods 7 are operated by cam wheel 15.

In operation, the lower tip of power rod 7 follows along the cam surface of cam wheel 15 whereby spring 9 is caused to compress. As power rod 7 passes over the pointed portion of the cam surface, as shown in FIGS. 2a and 5, spring 9 causes power rod 7 to snap downwardly thereby bringing magnet 8 and associated magnet 14 into close proximity. As cam wheel 15 continues to rotate power rod 7 moves upward vertically moving magnet 8 to the maximum distance from magnets 14 wherein the process is repeated and power rod 7 moves quickly vertically downward. Depending on whether the magnets are in an attractive or repulsive orientation, wheel 12 is caused to rotate one direction or the other thereby producing rotational energy to output shaft 13.

What is claimed is:

1. A magnetic motor comprising a frame, a power rod slidably disposed within said frame, an output shaft rotatably mounted on said frame, a balance wheel mounted on said output shaft, a first permanent magnet affixed to the outer periphery of said balance wheel, a compression spring coaxially disposed with respect to said power rod, a second permanent magnet affixed to said power rod, a cam wheel mounted on said output shaft, and the lower end of said power rod arranged to follow the cam surface of said cam wheel.

2. A magnetic motor according to claim 1 wherein said first and second magnets have opposing surfaces and said surfaces being arranged such that the magnetic force between said surfaces is repulsive.

3. A magnetic motor according to claim 1 wherein said first and second magnets have opposing surfaces and said surfaces being arranged such that the magnetic force between said surfaces is attractive.

4. A magnetic motor according to claim 1 wherein said first and second magnets are at least partially encased in shields.

5. A magnetic motor according to claim 1 wherein said cam surface comprises am angular surface.

6. A magnetic motor according to claim 1 wherein said cam surface is rounded and wherein the lower tip of said power rod is provided with a wheel to follow said rounded cam surface.

7. A magnetic motor according to claim 1 wherein said cam surface is disposed on the side of said cam wheel.

8. A magnetic motor according to claim 1 wherein a C-shaped support arm is integrally joined to said frame and wherein said rod is slidably disposed in apertures formed in said C-shaped support arm.

9. A magnetic motor according to claim 1 wherein said compression spring urges said second magnet into proximity with said first magnet.

10. A magnetic motor according to claim 1 wherein multiple first magnets are disposed on the periphery of said balance wheel.

11. A magnetic motor according to claim 1 wherein said first and second magnets have opposing surfaces which are angularly disposed with respect to the axis of said power rod.

12. A magnetic motor according to claim 1 wherein a second balance wheel is mounted on said output shaft.

* * * * *